United States Patent
Berangi et al.

(10) Patent No.: US 7,376,197 B2
(45) Date of Patent: May 20, 2008

(54) SIGNAL PEAK REDUCTION CIRCUIT FOR NON-CONSTANT ENVELOPE MODULATION SIGNALS

(75) Inventors: Reza Berangi, Melbourne (AU); Michael Faulkner, Moonee Ponds (AU)

(73) Assignee: Prescient Networks Pty Ltd., Bentley (AU)

( * ) Notice: Subject to any disclaimer, the term of this patent is extended or adjusted under 35 U.S.C. 154(b) by 755 days.

(21) Appl. No.: 10/311,872

(22) PCT Filed: Jun. 20, 2001

(86) PCT No.: PCT/AU01/00741

§ 371 (c)(1), (2), (4) Date: Jun. 24, 2003

(87) PCT Pub. No.: WO01/99279

PCT Pub. Date: Dec. 27, 2001

(65) Prior Publication Data

US 2005/0163248 A1    Jul. 28, 2005

(51) Int. Cl.
*H04B 15/00* (2006.01)

(52) U.S. Cl. .................................. 375/285; 375/296

(58) Field of Classification Search ............... 375/285, 375/259, 377; 330/306, 302, 250
See application file for complete search history.

(56) References Cited

U.S. PATENT DOCUMENTS

| | | | | |
|---|---|---|---|---|
| 4,371,842 A | * | 2/1983 | Lee | .................... 330/141 |
| 4,495,643 A | | 1/1985 | Orban | |
| 5,493,587 A | | 2/1996 | Sandri et al. | |
| 5,608,760 A | | 3/1997 | Sandri et al. | |
| 6,385,238 B1 | * | 5/2002 | Nguyen | ................. 375/232 |

* cited by examiner

*Primary Examiner*—Temesghen Ghebretinsae
(74) *Attorney, Agent, or Firm*—Finnegan, Henderson, Farabow, Garrett & Dunner, LLP

(57) ABSTRACT

Circuits for reducing the signal peaks in telecommunications signals are described. The circuits and methods are preferably adapted for reducing the peak to average power ratio of non-constant envelope modulation signals. In one example the circuit includes a band-limiting filter for limiting the bandwidth of a data bearing signal and a predictive filter for predicting peaks in the data bearing signal at the output of the pulse-shaping filter. The circuit also includes a clipping processor for generating a compensation signal in response to one or more signal peaks predicted by the predictive filter and a signal combining device for applying the compensation signal to the data bearing signal prior to amplification of the data bearing signal.

19 Claims, 10 Drawing Sheets

(a)

(b)

SIGNAL PEAK REDUCTION CIRCUIT FOR NON-CONSTANT ENVELOPE MODULATION SIGNALS

BACKGROUND OF THE INVENTION

1. Field of the Invention

The present invention relates generally to circuits and methods for reducing the signal peaks in telecommunications signals, and in particular to circuits and methods for reducing the peak to average power ratio of non-constant envelope modulation signals. The present invention is suitable for use in applications involving multi-code Code Division Multiple Access (CDMA) signals, Orthogonal Frequency Division Multiplexing (OFDM) signals and critically sampled complex Gaussian signals, and it will be convenient to described the invention in relation to these exemplary applications. It will be appreciated, however, that the invention is not limited to use in these applications only.

2. Description of Related Art

Telecommunications devices that transmit signals with a high peak to average power ratio (PAPR), such as multi-code CDMA signals, require output power amplifiers with large peak power capabilities. Such amplifiers are large and costly, and have high power requirements. If such amplifiers cannot handle the peak power signal levels then the resulting saturation causes inter-modulation products and Adjacent Channel Interference (ACI). A number of techniques exist for reducing the peak to average ratio, but many of these are modulation dependent, for example, coding, partial transmit sequences, or phasing for (OFDM) and Multi-Carrier Spread Spectrum.

FIG. 1 illustrates a portion 1 of the transmission path of a multi-code CDMA transceiver, in which a signal's in-phase and quadrature (I & Q) components are up-converted by an up-converter 2 or a number of upconversion stages for amplification by an amplifier 3, and subsequent transmission. A pulse-shaping interpolation filter 4 or other filtering is used to band limit the signal supplied to the up-converter 2. One effective method of preventing saturation of the amplifier 3 is to introduce a signal peak clipper before the amplifier 3. There are two possible positions in a transmitter for the clipper, namely the placement of a clipper 5 before the filter 4 or the placement of a clipper 6 after the filter 4. Placing a clipper after the filter prevents amplifier saturation, eliminating AM to PM distortion in the amplifier saturation region, but still generates ACI. The latter can be reduced by peak windowing, or eliminated all together by putting the clipper before the filter. However, the placement of the clipper 5 before the filter 4 can cause regrowth of the clipped peaks, which can again cause amplifier saturation. Harder clipping, or over-clipping, can prevent peak re-growth but attenuates the signal more than necessary.

BRIEF SUMMARY OF THE INVENTION

It would therefore be desirable to provide a circuit and method for reducing telecommunications signal peaks that minimises amplifier saturation without introducing unnecessary signal attenuation.

It would also be desirable to provide a circuit and method for reducing telecommunications signal peaks that ameliorates or overcomes one or more disadvantages of known telecommunications techniques and circuits.

With this in mind, one aspect of the present invention provides a signal peak reduction circuit, comprising:

a band-limiting filter or filters for limiting the bandwidth of a data bearing signal, a predictive filter for predicting peaks in the data bearing signal at the output of the pulse-shaping filter, a clipping processor for generating a compensation signal in response to one or more signal peaks predicted by the predictive filter, and a signal combining device for applying the compensation signal to the data bearing signal prior to band limiting and amplification of the data bearing signal.

In one embodiment, the data bearing signal includes I and Q data symbols. The data symbols may be zero stuffed for interpolation.

The signal peals reduction circuit may include a delay line for delaying application of the data bearing signal to the band limiting filter or filters. The delay line may include a plurality of delay elements and may form part of the predictive filter. The signal combining device may apply the compensation signal at or near the centre of the delay line.

The compensation signal may include a correction vector. The signal combining device may act to apply the correction vector to a single data sample position. The correction vector may be applied at the sample position on the delay line activating the largest filter tap.

Alternatively, the correction vector may include a plurality of vector components, the signal combining device acting to distribute the vector components to a plurality of data symbols or samples.

The signal combining device may distribute the vector components to the data symbols activating the largest filter tap values.

The compensation signal may include a plurality of gain adjustment signals for adjusting the gain of a plurality of data symbols in the predictive filter.

The gain adjustment may be applied to the symbols activating the largest active sub-filter tap values.

The clipping processor may compare the magnitude of the output of the predictive filter with a threshold level to detect peak values of the data bearing signal.

The clipping processor may generate a compensation signal for application to the data bearing signal at a maximum peak value of the data bearing signal.

Alternatively, the clipping processor may generate a compensation signal for application to the data bearing signal every time the amplitude of the data bearing signal exceeds the threshold level.

A signal clipper may be used to limit the amplitude of the data bearing signal introduced to the signal peak reduction circuit.

The set clipping levels of the signal clipper and the predictive filter may be independently adjustable with respect to the amplifier clipping level.

Another aspect of the invention may provide signal peak reduction, circuitry including a plurality of signal peak reduction devices as described above, connected in series.

BRIEF DESCRIPTION OF THE DRAWINGS

The following description refers in more detail to the various features of the present invention. To facilitate an understanding of the invention, reference is made in the description to the accompanying drawings where the invention illustrated in several embodiments. It is to be understood that the invention is not limited to the embodiments illustrated in the drawings.

In the drawings.

DETAILED DESCRIPTION OF THE INVENTION

Figure 1:
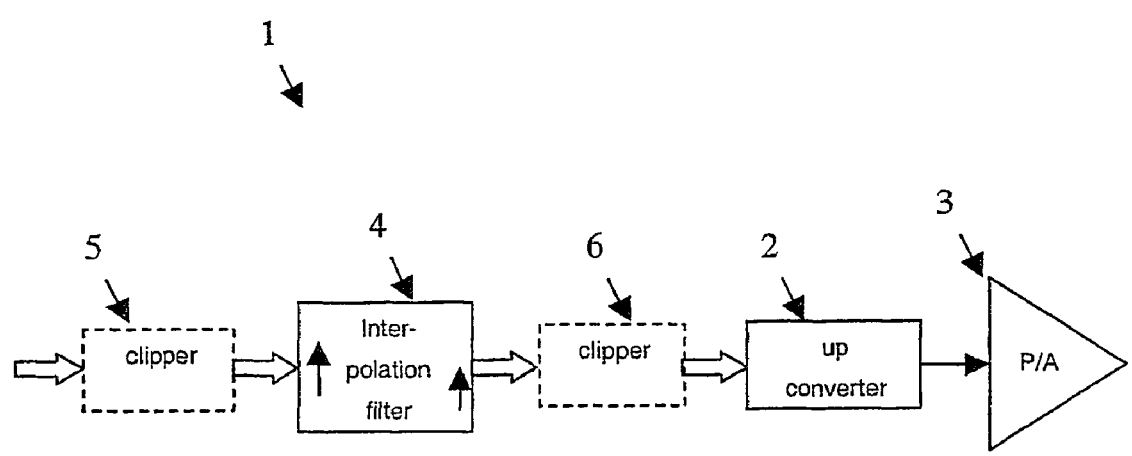
FIG. 1, which has been previously described, is a schematic diagram of a portion of a transmission path of a multi-code CDMA transceiver.
Figure 2:
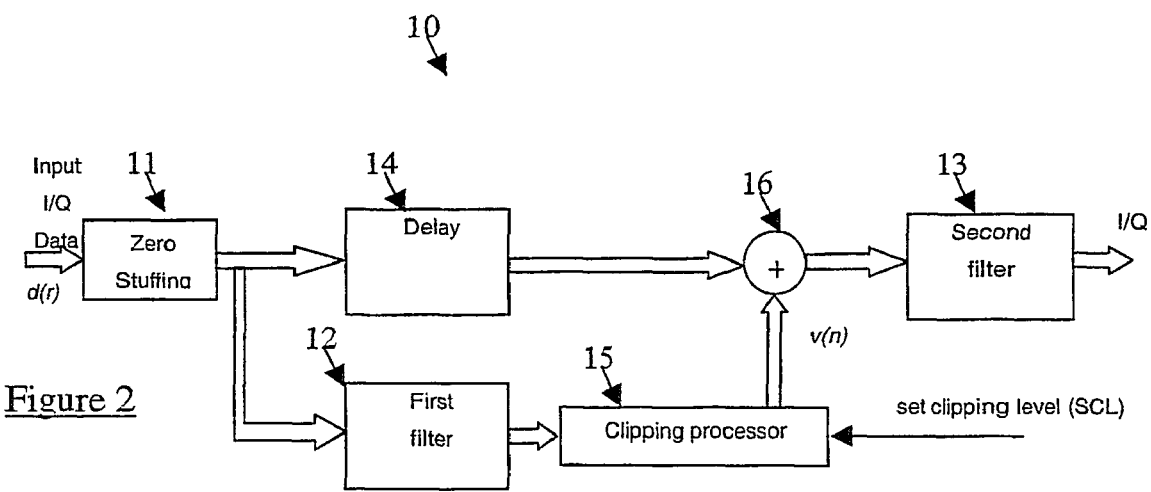
FIG. 2 is a schematic diagram of a first embodiment of a signal peak reduction circuit according to the present invention.
Figure 4:
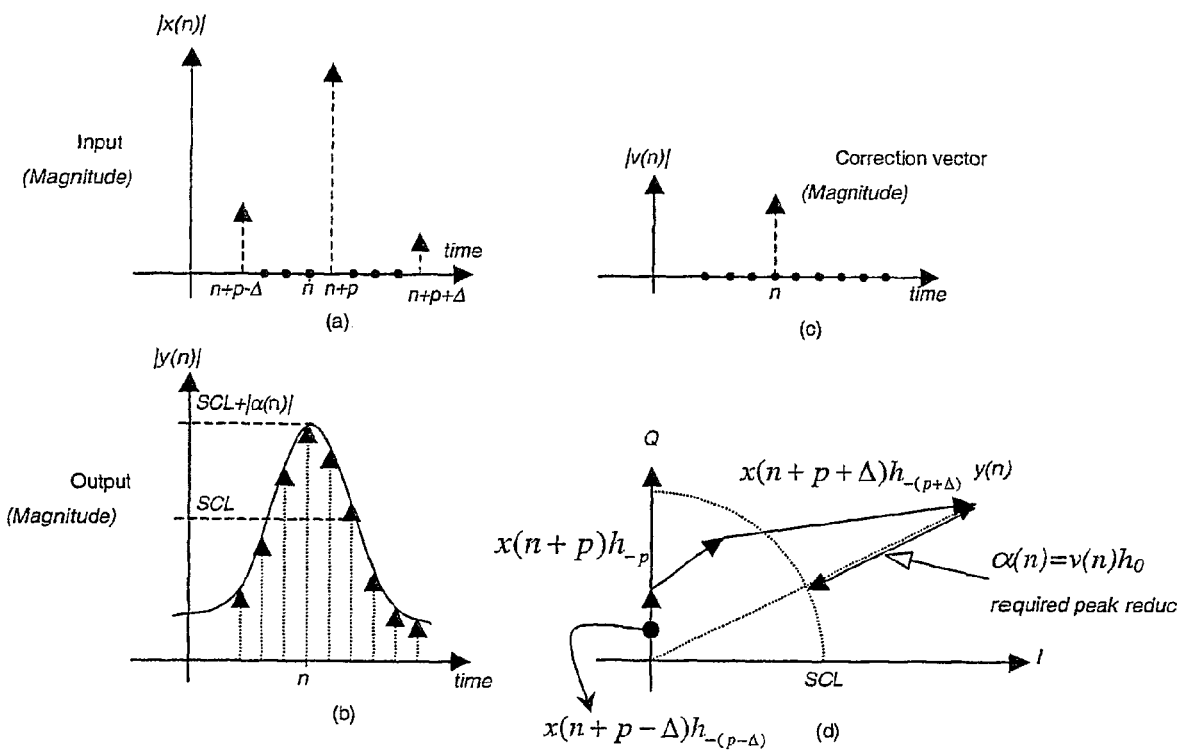
FIGS. 4(a) and (b) are graphical representations of data symbols at various locations in the circuits of FIGS. 2 and 3.
FIG. 4(c) shows graphical representation of an output correction vector generated by a clipping processor forming part of the signal peak reduction circuit of FIGS. 2 and 3.
FIG. 4(d) shows the component parts of an amplitude sample and the output correction vector as processed by FIG. 2 and FIG. 3.

Referring now to FIG. 2, there is shown generally a schematic diagram of a signal peak reduction circuit 10 according to the present invention. The circuit 10 includes a zero bit stuffer 11, a predictive interpolation filter 12 and band-limiting filter 13, a delay line 14, a clipping processor 15 and a signal-summing device 16. Input I/Q data symbols, d(r), are zero stuffed by the zero bit stuffer 11 to form a signal x(n)—as shown in FIG. 4(a)—and then fed to two successive identical or closely matched filters 12 and 13 for interpolation. The filter 12 is a predictive filter that models the response of the second filter 13 and optionally any subsequent filtering prior to the P/A to the data bearing signal from the zero bit stuffer 11. The predictive filter 12 is used for predicting peaks in the data bearing signal and providing an output signal to the clipping processor 15 for generating the compensation signal in response to the detected peaks, in this case a correction vector, v(n). The correction vector is subtracted from the signal, x (appropriately delayed by the delay line 14), before passing through the second interpolation filter 13 and the up-conversion circuitry, as shown in FIG. 1. Whilst the second filter 13 is represented in this Figure by a single element, the second filter 13 may encompass all filtering elements between the predictive filter 12 and the amplifier of a given transceiver.

The elimination of signal peaks is not optimal in the circuit shown in FIG. 2 because the added compensation signal is smeared over the impulse length of the second filter, which can cause additional peaks to occur at other parts of the waveform.

Figure 3:
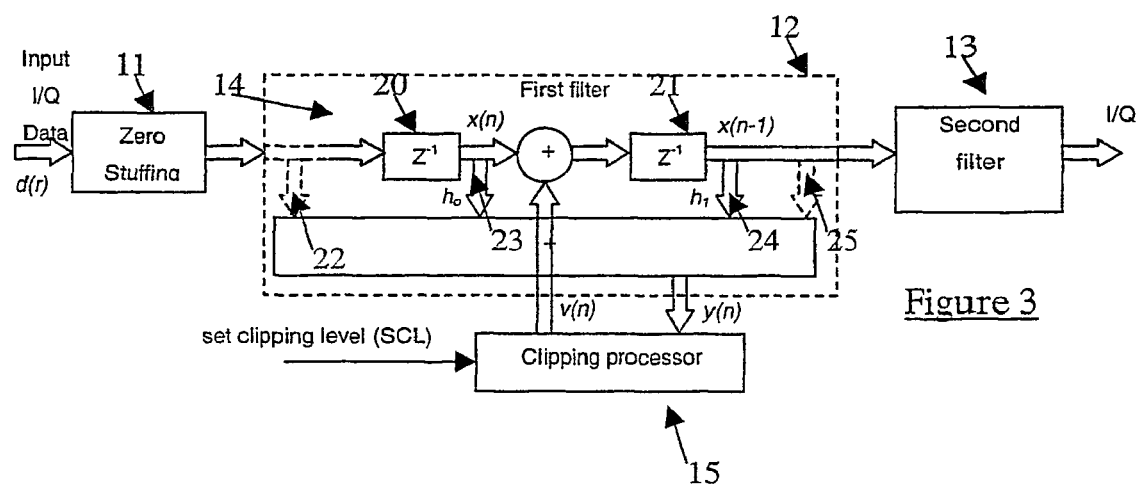
FIG. 3 is a schematic diagram of a second embodiment of a signal peak reduction circuit according to the present invention.

In the structure shown in FIG. 3, the predictive filter 12 is realised as a Finite Impulse Response (FIR) filter. The delay line 14 is incorporated into the delay line component of the prediction filter 12 and includes multiple delay elements, such as those referenced 20 and 21. Adjacent delay elements in the delay line separate filter taps, such as those referenced 22 to 25. For a linear phase filter, the point at which the compensation signal is applied to the data bearing signal is preferably towards or at the centre of the delay line 12 in order to compensate for the group delay of the filter. For other filters, the compensation vector is applied to the sample activating the largest filter tap value. The signal-summing device 16 is located, in this example, in order to apply the correction vector at the output of the clipping processor 15 to the centre of the prediction filter delay line structure. Such an arrangement reduces the potential for additional peaks by including the latter half of the smeared v(n) waveform in the output estimate y(n). The input to the second filter can also be taken from the delay line directly after the signal summing device 16 (just before the delay element 21) to reduce signal latency.

The clipping processor 15 compares the amplitude of the output of the predictive filter 12 with a threshold level, referred to as a Set Clipping Level (SCL), to detect the peaks of that output. When the filter output magnitude, |y(n)| exceeds the clipping threshold, as shown in FIG. 4(b), at time n, a correction vector v(n)—as shown in FIG. 4(c)—is subtracted from the data bearing signal fed to the input of the second filter 13 at the exact position where the correction is required as determined by the clipping processor 15. This position is not necessarily synchronised with that of the input data samples, but will frequently fall on one of the zero interpolated samples. The correction vector v(n) is so calculated to limit the magnitude of the output signal of the predictive filter 12 to the SCL value. A vector representation of the calculation of y(n) is shown in FIG. 4(d). The correction required at the output of the filter 12 to stop clipping is α(n), and is equal to the effect of v(n) on the filter output at time n.

The clipping processor calculates the required value of SCL as follows:

$$SCL = |y(n) - \alpha(n)| \quad (1)$$

The shortest correction vector α(n) is in-phase with y(n) and simplifies (1) to $$|\alpha(n)| = |y(n)| - SCL \quad (2)$$

If the correction vector v(n) is added to the centre of the filter delay line 14, the relation between α(n) and v(n) can be expressed as $$\alpha(n) = h_0 v(n) \quad (3)$$

Combination of (2) and (3) gives v(n) as:

$$v(n) = \left(1 - \frac{SCL}{|y(n)|}\right)\frac{y(n)}{|h_0|} \quad (4)$$

The correction vector v(n) is the error introduced to the data bearing signal. Filtering by the second filter 13 distributes this error to other signal samples such that each of the received samples in the range of the filter impulse response can receive part of this error. The smeared error to a given output sample at time instant m can be expressed as:

$$e(m) = h_{m-n} v(n) \quad (5)$$

The total error power after decimation can be calculated as:

$$e_v^2 = \sum_{n-(M-1)/2 \leq m \leq n+(M-1)/2} |e(m)|^2, m = n - p + k\Delta, k \in \{0, \pm 1, \pm 2, \dots\} \quad (6)$$

Where $\Delta$ is the decimation interval and p is the offset of n from the closest sampling point. To simplify the derivations, the filter impulse response length, M, is assumed to be odd. Without loss of generality n can be set to zero. Substituting (5) into (6) and averaging:

$$\overline{e_v^2} = \frac{|v|^2}{\Delta} \sum_{p=0}^{\Delta-1} \sum_{-(M-1)/2 \leq m \leq +(M-1)/2} |h_m|^2, \quad (7)$$

$$m = -p + k\Delta, k \in \{0, \pm 1, \pm 2, \dots\}$$

Which assumes that there is an equal probability that y(n) exceeds the SCL for all the interpolated samples. This simplifies to:

$$\overline{e_v^2} = \frac{|v|^2}{\Delta} \sum_m |h_m|^2 \quad (8)$$

If the filter has a unit DC gain (i.e.

$$\left(\text{i.e. } \sum_m |h_m|^2 = 1\right),$$

error will be:

$$\overline{e_v^2} = \frac{|v|^2}{\Delta} \quad (9)$$

Figure 5:
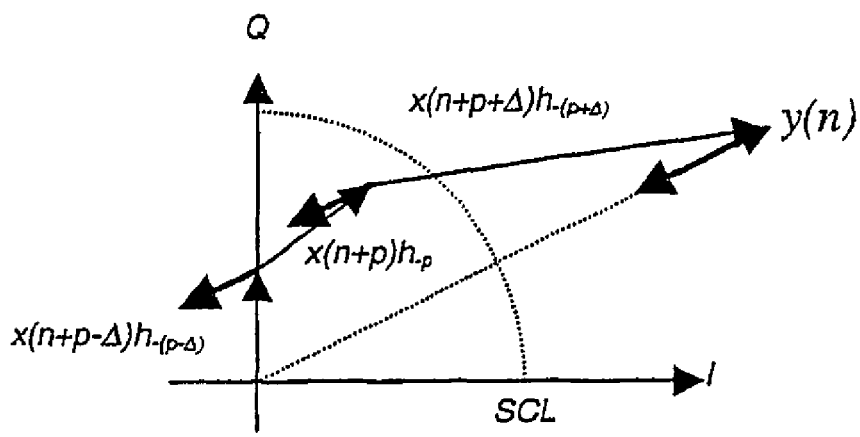
FIG. 5 is a graphical representation of vectors formed by the in-phase and quadrature components of data symbols within a data bearing signal processed by the circuit of FIG. 2 and showing the correction vectors.
Figure 6:
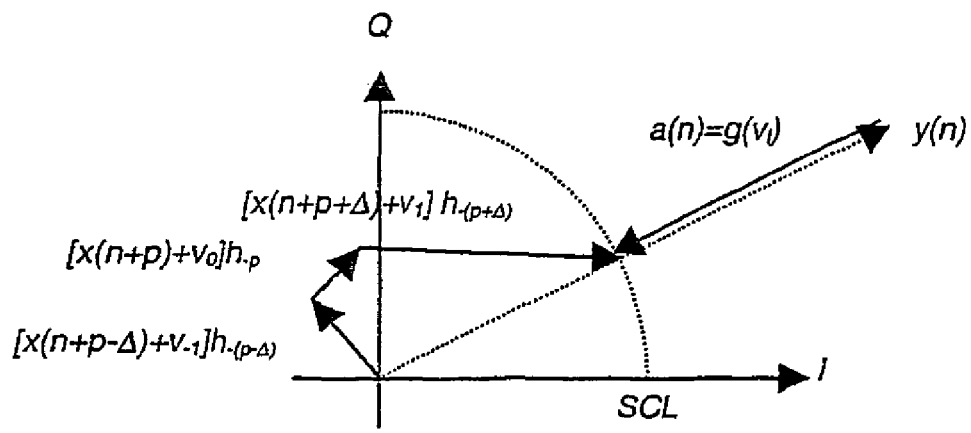
FIG. 6 is a graphical representation of vectors formed by the appropriate correction vectors summed with the in-phase and quadrature components of data symbols within a data bearing signal processed by the circuit of FIG. 7.

The asynchronous position of the correction vector in the above-described method requires a brute-force structure for the interpolation that is zero sample insertion 11 followed by filtering 12 and 13. The complexity can be significantly reduced if poly-phase structures are used. To achieve this, the correction vector can be distributed among a number, N, of the M data symbols forming the filter output, y(n), as can be seen in FIGS. 5 and 6.

The distribution of the correction vector can be optimised by minimisation of the error defined as:

$$e_d^2(v_i) = \sum_i |v_i|^2 \quad (10)$$

provided that $$g(v_i) = \sum_i h_{-(p+i\Delta)} v_i = \alpha(n) \quad (11)$$

The summation is for all N symbols over which the correction vector, $v_i$, is to be distributed. Note $h_{-(p+i\Delta)}$ is the corresponding filter tap value for $v_i$ when the filter calculates y(n). The square error, $e_d^2$, is a quadratic function and hence can be optimised using a Lagrange multiplier. The Lagrange multiplier minimizes:

$$H(v_i) = e_d^2(v_i) + \lambda[g(v_i) - \alpha(n)] \quad (12)$$

The parameter $\lambda$ is set to give $$\nabla H(v_i) = 0 \quad (13)$$

The set of Equation (13) consists of N equations of the form $$\frac{\partial}{\partial v_i} e_d^2(v_i) + \lambda \frac{\partial}{\partial v_i} g(v_i) = 0 \quad (14)$$

Substituting (10) and (11) into (14) and using complex derivations gives N equations $$2v_i + \lambda h_{-(p+i\Delta)} = 0 \quad (15)$$

Some mathematical manipulation on (15) yields the values of the distributed correction vectors $$v_k = \frac{h_{-(p+k\Delta)} \alpha(n)}{\sum_i h_{-(p+i\Delta)}^2} \quad (16)$$

Substituting (16) into (10) provides $$e_d^2 = \frac{|\alpha(n)|^2 \sum_i |h_{-(p+i\Delta)}|^2}{\left|\sum_i h_{-(p+i\Delta)}^2\right|^2} \quad (17)$$

For a real valued filter taps, (17) can be simplified to $$e_d^2 = \frac{|\alpha(n)|^2}{\sum_i h_{-(p+i\Delta)}^2} \quad (18)$$

Equation (18) implies that increasing the number of contributing symbols decreases the error. Moreover, the equation suggests that the symbols with the largest tap magnitudes should be chosen for applying the distributed correction vector. These symbols are normally located near or at the centre of the filter's impulse response. The average error can be found by averaging (17) for different positions, p, of the correction vector with regard to its nearest data symbols.

The distributed-vector-subtraction method always has a higher error than vector-subtraction method, but the error tends to reduce with an increasing number of symbols, N, over which the correction vector is distributed.

Figure 7:
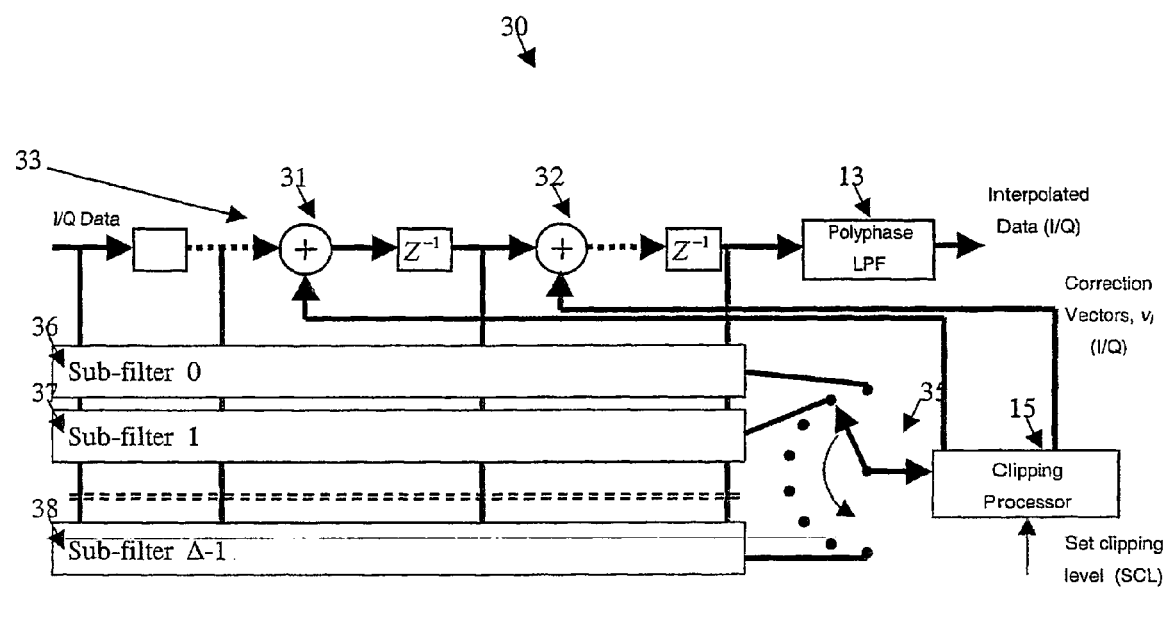
FIG. 7 is a schematic diagram of a third embodiment of a signal peak reduction circuit according to the present invention.

A block diagram of a signal peak reduction circuit 30 for implementing the distributed-vector-subtraction method, in this case having a double symbol correction vector (N=2), is shown in FIG. 7. This circuit 30 applies the two correction vector components to those data symbols in the data bearing signal having the highest tap values, that is, those data symbols closest to the peak value, y(n), at time n. This is enabled by the use of two complex signal summing devices 31 and 32 at the centre of the delay line 33 of the predictive filter 34.

In this example, the filters 34 and 13 are realised by a poly-phase structure. The filter 34 includes multiple subfilters, such as those referenced 36, 37 and 38 in FIG. 7. A rotary switch 35 feeds the output samples at each clock pulse from each sub-filter 36 to 38 to the clipping processor 15, and compares these output samples with the clipping level SCL. The appropriate vectors, $v_0$ and $v_1$ are then calculated by the clipping processor 15 and applied to the complex adders 31 and 32. In a circuit implementing a one-sample distributed-vector-subtraction method (N=1), only one correction vector $v_0$ would be applied to the symbol position activating the highest tap value, h, from the current subfilter.

Figure 8:
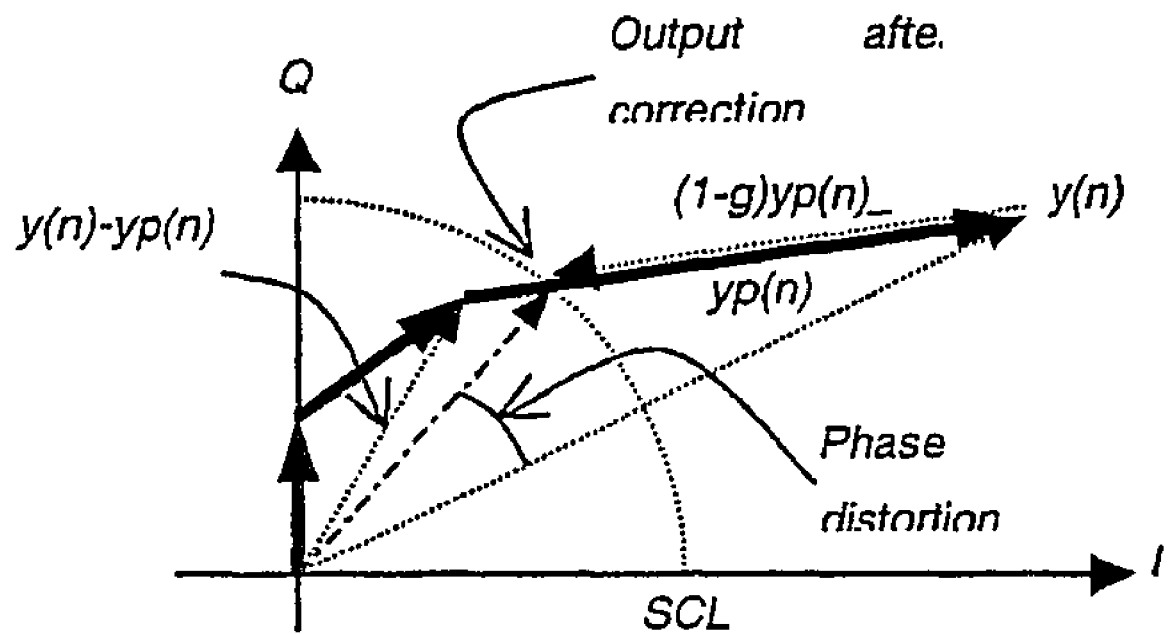
FIG. 8 is a graphical representations of vectors formed by the in-phase and quadrature components of data symbols within a data bearing signal processed by the circuit of FIG. 9.

In an alternative method, referred to herein as the gainadjustment method, the gain of a group of complex data symbols is changed to reduce the peak to average ratio, as seen in FIG. 8. The partial contribution, yp(n), of N selected symbols on the filter output, y(n), is $$yp(n) = \sum_{i=1}^{N} h_{-(p+i\Delta)} x(n + p + i\Delta) \quad (19)$$

Applying a gain g on yp(n), can force the output to the SCL (set clipping level):

$$SCL = |y(n) - (1-g)yp(n)| \quad (20)$$

The linearity of (19) shows that applying a gain on yp(n) corresponds to applying the same gain to the filter input. This method can only be applied if yp(n) is large enough to compensate the peak power.

$$|y(n) - yp(n)| \leq SCL \quad (21)$$

A graphical representation of (20) is shown in FIG. 8. Squaring both sides of (20) gives $$SCL^2 = |y(n)|^2 + (1-g)^2|yp(n)|^2 - (1-g)[yp(n)y(n)^* + yp(n)^*y(n)] \quad (22)$$

Equation (22) can be rearranged as $$A(1-g)^2 - 2B(1-g) + C = 0 \quad (23)$$

where $A = |yp(n)|^2$, $C = |y(n)|^2 - SCL^2$ and $B = [yp(n)y(n)^* + yp(n)^*y(n)]/2$. The solution for the second order equation (23) is $$g = 1 + \frac{-B \pm \sqrt{B^2 - AC}}{A} \quad (24)$$

The g can be complex. Restricting g to a real positive number can simplify the implementation because only real gain is needed for 42 and 43. In which case $$g = 1 + \frac{-B + \sqrt{B^2 - AC}}{A} \quad (25)$$

Precautions must be taken to prevent gain adjustment when A is very small, causing round off errors.

Figure 9:
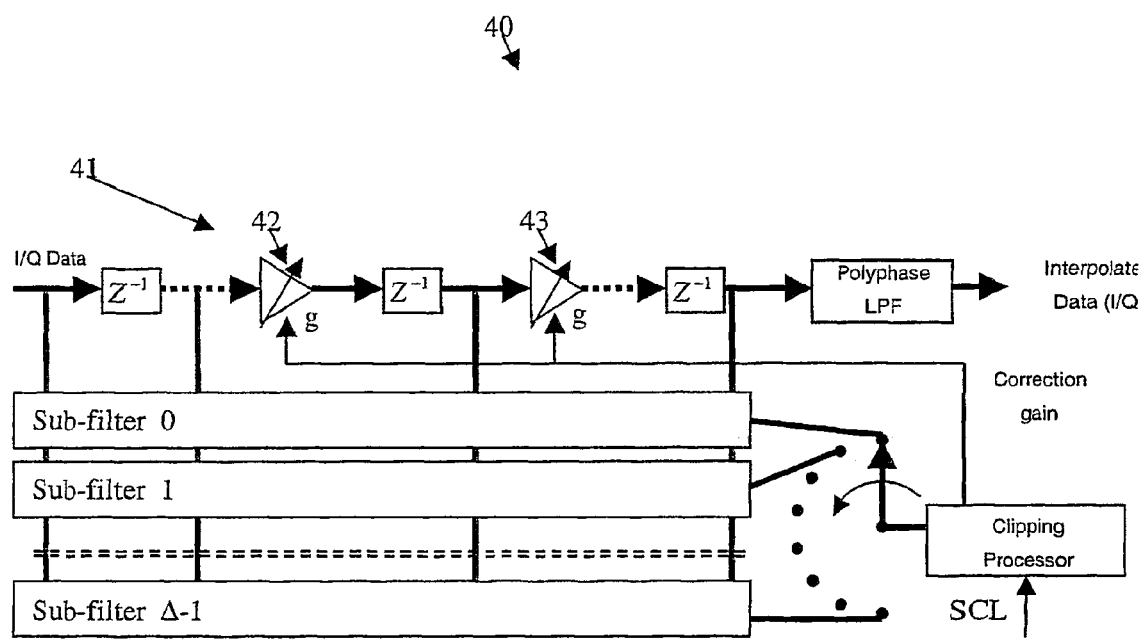
FIG. 9 is schematic diagram of a fourth embodiment of a signal peak reduction circuit according to the present invention.

A block diagram of a signal peak reduction circuit 40 implementing this gain-adjustment method, similar to the corresponding the previously described circuit implementing the distributed-vector-subtraction method, is shown in FIG. 9. In this case, the circuit uses two symbol correction. Rather than signal summing devices 31 and 32, the delay line 41 in this figure includes variable gain amplifiers 42 and 43 for adjusting the signal gain at the centre. The feed to the second filter 13 can be taken immediately after the last gain adjustment stage to reduce latency.

The square error introduced by the gain-adjustment method can be defined as $$e_g^2 = \sum_i |x(n + p + i\Delta) - gx(n + p + i\Delta)|^2 \quad (26)$$

Where the summation is taken over the N values of i. The error here depends on the signal and cannot be directly compared with what is obtained for the vector-subtraction and distributed-vector-subtraction methods because the compensated peak can undergo some phase distortion if g is real. This further adds to the error illustrated in FIG. 8 which shows the correction for a single symbol real gain adjustment (N=1).

Figure 10:
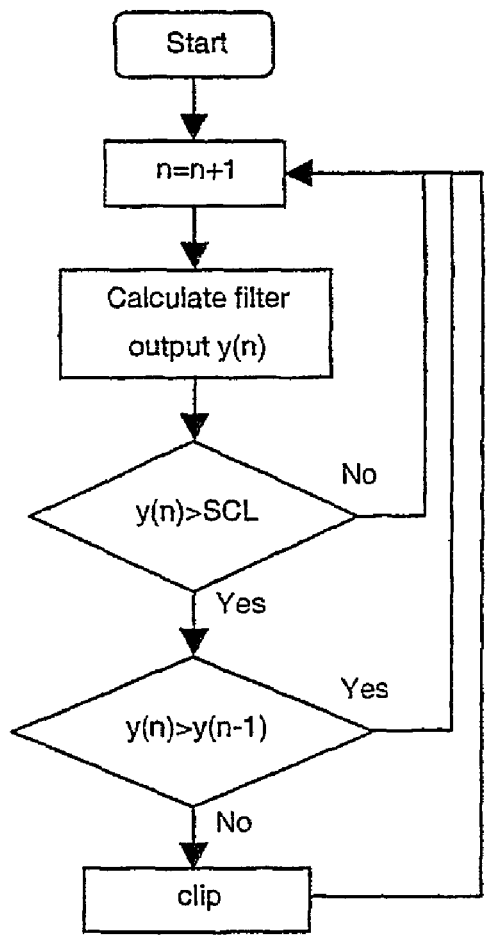
FIGS. 10(a) and (b) are flow diagrams respectively of a peak detection algorithm and a level detection algorithm for implementation by any of the circuits of FIGS. 2, 3, 7, 9 and 12.
Figure 10:
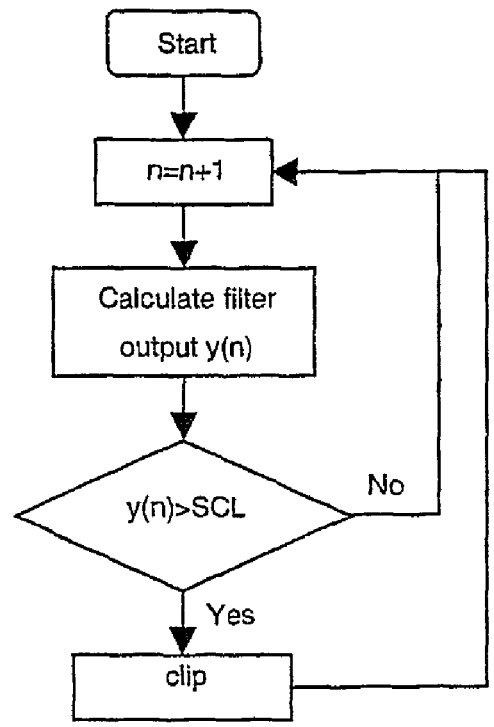

Peak detection and compensation may be performed by use of an iterative algorithm to search and find the filter output for peaks larger than the clipping level. Two different compensation strategies may be adopted. In the first method, peak, detection algorithm (PDA), the compensation is performed whenever there is a peak in y(n) which exceeds the SCL (sample n in FIG. 4(b)). In the second method, level detection algorithm (LDA), the compensation is performed every time (sample) that the signal amplitude exceeds SCL whether this is at a peak or not (samples n−1, n, n+1, n+2 in FIG. 4(b)). The former needs an extra comparison to identify the change in slope (+ve to −ve) that determines the presence of a peak, while the latter compensates the signal more often, and so the number of calculations is greater. A flow graph of the two detection algorithms is shown in FIGS. 10(a) and 10(b).

The compensation methods previously described are intended to eliminate overshoot of the set clipping level (SCL) at a single data sample point only. However, such filtering causes the introduced compensation signals (correction vectors or gain adjustments) to effect other parts of the output waveform, which can cause amplitude overshoot at sample times where there were none before. This effect is particularly noticeable when there are a number of successive peaks, where compensation of one peak may re-grow the previously compensated peaks. This phenomenon is common in nearly all the clipping compensation methods and can lead to amplifier saturation.

Figure 11:
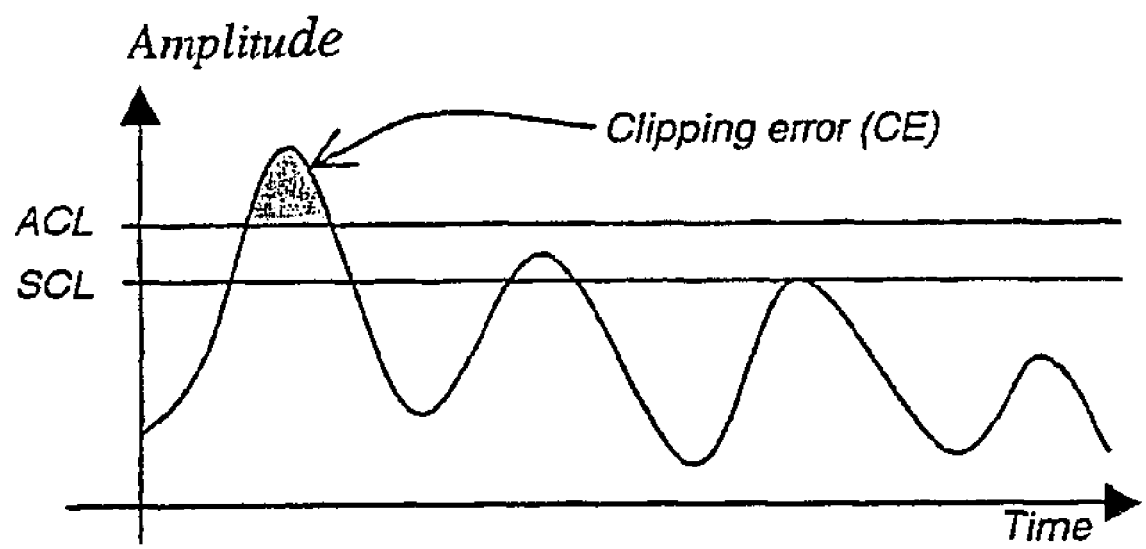
FIG. 11 is a graphical representation of a data bearing signal processed by any one of the circuits shown in FIGS. 2, 3, 7 and 9.

One method to prevent this is to use a set clipping level (SCL) lower than the amplifier clipping level (ACL), the level at which the amplifier saturates, as illustrated in FIG. 11. This lower set clipping level (SCL) reduces the chance of re-grown peaks saturating the amplifier. The ACL defines the peak power of the transmitted signal from which the peak to average power ratio (PAPR) of the transmitted signal can be calculated.

Figure 13:
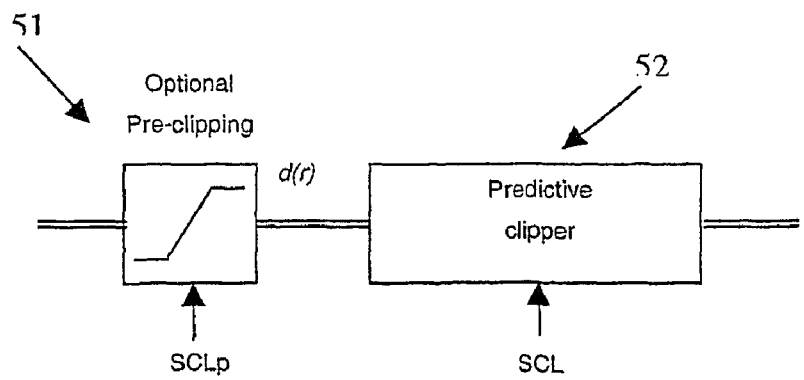
FIG. 13 is a schematic diagram of a sixth embodiment of a signal peak reduction circuit according to the present invention.

A method of preventing peaks overshooting the set clipping level (SCL) is to add a conventional clipper 51 before any of the previously described predictive filters, here referenced 52. The additional conventional clipping stage 51 shown in FIG. 13 acts as a data preclipper and reduces peak regrowth.

Figure 12:
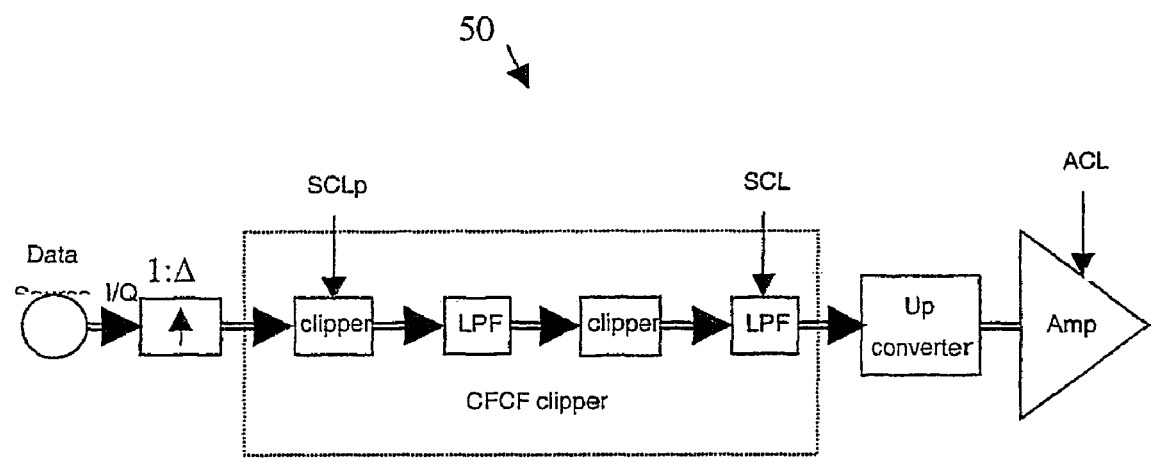
FIG. 12 is a schematic diagram of a fifth embodiment of a signal peak reduction circuit according to the present invention.

FIG. 12 shows a cascaded version of a signal peak reduction circuit, referred to herein as a clip-filter-clip-filter (CFCF) circuit. The CFCF circuit 50 has one more clipping stage than the clipping circuits shown in FIGS. 2, 3, 7 and 9. The second stage clips the re-grown peaks and the last filter attenuates the spectral leakage into adjacent channels that this might cause.

The performance of the previously described peak reduction techniques can evaluated using two performance criteria: the mean squared error (MSE) which effects the performance of the link by adding in-band noise to the desired signal, and the clipping error (CE) which occurs in the amplifier and generates out-of-band interference to other users. These two criteria can be traded off against each other, with the final selection based on the system performance specifications. The trade-off can be obtained by independently adjusting the set clipping levels (SLCp or SCL) of the clipping stage(s) and the predictive filter(s) with respect to the amplifier clipping level (ACL). Clipping the signal to a level that is lower than the amplifier's ACL will reduce the probability of the amplifier becoming saturated by any peak re-growth caused by subsequent filtering after the clipping operation. The clipping error therefore reduces, improving the out-of-band spectrum, but in-band distortion is increased, and this shows up in an increased MSE.

It will be appreciated from the foregoing that in the single vector-subtraction implementation of the invention, the peak is cancelled where it occurs, which is usually in between the input data points d(m). The three other implementations adjust the data points themselves, either by adding a correcting vector (distributed-vector-subtraction implementation) or by multiplying them by a gain factor, g, that is between 0 and 1 (gain-adjustment implementation) or by limiting their amplitude (conventional clipping). Preclipping of the data bearing signal has been found to further improve to all implementations. All implementations do not require a block format for processing, and so are suitable for systems that require continuous transmission, such as CDMA.

The present invention can be used with any non-constant envelope modulations, such as QAM, PSK, multicarrier signals, OFDM and CDMA. In the exemplary embodiment described herein, the input signal is a multi-code CDMA signal (consisting of a sum of different (pseudo) random codes. The input signal is critically sampled, and therefore needs to be bandlimited (through a pulse-shaping filter) and up-converted prior to transmission. Interpolation is performed in the digital domain, which reduces the requirements on the reconstruction filter following digital to analog conversion. The impulse response of the overall filter is therefore dominated by the digital interpolation filter, which can be implemented in a poly-phase structure. The prediction filter should be designed to model the effect of the actual filtering (including analog, IF and RF filters) prior to the PA.

An acceptable reduction in complexity is to use only the largest contributing taps in the prediction filter, since these are the dominating contributors to peak regrowth.

Finally, it is to be understood that various modifications and/or additions may be made to the signal peak reduction circuit without departing from the spirit or ambit of the present invention as defined by the claims appended hereto.

The invention claimed is:

1. A signal peak reduction circuit for a transmitter, comprising:
a band-limiting filter or filters for limiting the bandwidth of a data bearing signal that includes I and Q data symbols,
a zero bit stuffer for zero stuffing the I and Q data symbols for interpolation,
a delay line for delaying application of the data bearing signal to the band limiting filter or filters,
a predictive filter for predicting peaks in the data bearing signal at the output of the band-limiting filter or filters,
a clipping processor for generating a compensation signal, that includes a correction vector, in response to one or more signal peaks predicted by the predictive filter, and
a signal combining device for applying the compensation signal to the data bearing signal prior to band limiting of the data bearing signal.

2. A signal peak reduction circuit according to claim 1, wherein the delay line includes a plurality of delay elements and forms part of the predictive filter, the signal combining device applying the compensation signal at a position the delay line.

3. A signal peak reduction circuit according to claim 1, wherein the signal combining device acts to apply the correction vector to a single data sample position.

4. A signal peak reduction circuit according to claim 3, wherein the correction vector has a value of vn=□n/h0, where □n is the required peak reduction, and h0 is the filter tap value at the single data sample position.

5. A signal peak reduction circuit according to claim 3, wherein the correction vector is applied at a sample position at or towards the centre of the filter delay line.

6. A signal peak reduction circuit according to claim 4, wherein the correction vector is applied at the sample position on the delay line activating the largest filter tap.

7. A signal peak reduction circuit according to claim 1, wherein
the correction vector includes a plurality of vector components,
the signal combining device acting to distribute the vector components to a plurality of data symbols or samples.

8. A signal peak reduction circuit according to claim 7, wherein the vector components are obtained from $$v_k = \frac{h_{-(p+k\Delta)}\alpha(n)}{\sum_i h^2_{-(p+i\Delta)}},$$

where $\square_n$ is the required peak reduction, h is a filter tap value, $\Delta$ is the decimation interval, p is the offset of n from the closest sampling point, and the denominator summation is over all the i=1 to N data samples where the correction vectors are applied.

9. A signal peak reduction circuit according to claim 8, wherein h−(p+k) is the active sub-filter coefficient of the symbol where the correction vector Vk is applied.

10. A signal peak correction circuit according to claim 8, wherein the signal combining device distributes the vector components to the data symbols activating the largest active sub-filter tap values.

11. A signal peak reduction circuit according to claim 1, wherein
the compensation signal includes a plurality of gain adjustment signals for adjusting the gain of one or more data symbols in the predictive filter.

12. A signal peak reduction circuit according to claim 11, wherein the gain of each of the plurality of data symbols is obtained from $$g = 1 + \frac{-B + \sqrt{B^2 - AC}}{A}$$

Where $A=|yp(n)|^2$, $C=|y(n)|^2-SCL^2$ and $B=[yp(n)y(n)^*+yp(n)^*y(n)]/2$;
and yp(n) is the partial contribution of N selected symbols to the prediction filter output of y(n) and SCL is the set clip level.

13. A signal peak reduction circuit according to claim 12, wherein the gain adjustment is applied to the symbols activating the largest active sub-filter tap values.

14. A signal peak reduction circuit according to claim 1, wherein the clipping processor compares the magnitude of the output of the predictive filter with a threshold level to detect peak values of the data bearing signal.

15. A signal peak reduction circuit according to claim 14, wherein the clipping processor generates a compensation signal for application to the data bearing signal at a maximum peak value of the data bearing signal.

16. A signal peak reduction circuit according to claim 14, wherein the clipping processor generates a compensation signal for application to the data bearing signal every time the amplitude of the data bearing signal exceeds the threshold level.

17. A signal peak reduction device, comprising a signal peak reduction circuit according to claim 1, and a signal clipper for limiting the amplitude of the data bearing signal introduced to the signal peak reduction circuit.

18. A signal peak reduction device, according to claim 17, wherein the set clipping levels of the signal clipper and the predictive filter are independently adjustable with respect to the amplifier clipping level.

19. Signal peak reduction circuitry including a plurality of signal peak reduction devices according to claim 17, connected in series.

* * * * *

UNITED STATES PATENT AND TRADEMARK OFFICE
CERTIFICATE OF CORRECTION

PATENT NO. : 7,376,197 B2
APPLICATION NO. : 10/311872
DATED : May 20, 2008
INVENTOR(S) : Reza Berangi et al.

Page 1 of 1

It is certified that error appears in the above-identified patent and that said Letters Patent is hereby corrected as shown below:

In claim 2, column 10, line 33, "position the" should read --position on the--.

In claim 4, column 10, line 39, "vn=□n/h0," should read --$v_n = \alpha_n / h_0$,--.

In claim 4, column 10, line 40, "□n" should read --$\alpha_n$--.

In claim 4, column 10, line 40, "h0" should read --$h_0$--.

In claim 5, column 10, line 44, "centre" should read --center--.

In claim 8, column 10, line 63, "□$_n$," should read --$\alpha_n$--.

In claim 8, column 10, line 66, "over all" should read --overall--.

In claim 9, column 11, line 2, "h-(p+k)" should read --$h-(_{p+k}\Delta)$--.

In claim 9, column 11, line 3, "Vk" should read --$V_k$--.

Signed and Sealed this

Eighth Day of September, 2009

David J. Kappos
*Director of the United States Patent and Trademark Office*